United States Patent
Schlipf et al.

(10) Patent No.: US 9,438,476 B2
(45) Date of Patent: Sep. 6, 2016

(54) SELF-ORGANIZATION OF A SATELLITE GRID

(75) Inventors: Carsten Schlipf, Gaeufelden (DE); Joern Schimmelpfeng, Herrenberg (DE); Stefan Bergstein, Boeblingen (DE)

(73) Assignee: Hewlett Packard Enterprise Development LP, Houston, TX (US)

( * ) Notice: Subject to any disclaimer, the term of this patent is extended or adjusted under 35 U.S.C. 154(b) by 127 days.

(21) Appl. No.: 14/002,274

(22) PCT Filed: Mar. 17, 2011

(86) PCT No.: PCT/US2011/028840
§ 371 (c)(1),
(2), (4) Date: Aug. 29, 2013

(87) PCT Pub. No.: WO2012/125167
PCT Pub. Date: Sep. 20, 2012

(65) Prior Publication Data
US 2013/0336168 A1 Dec. 19, 2013

(51) Int. Cl.
*H04L 12/28* (2006.01)
*H04B 7/185* (2006.01)
*H04L 12/24* (2006.01)

(52) U.S. Cl.
CPC ....... *H04L 41/0886* (2013.01); *H04L 41/0813* (2013.01); *H04L 41/30* (2013.01)

(58) Field of Classification Search
CPC .................................................. H04L 41/0886
USPC ........................................................ 370/255
See application file for complete search history.

(56) References Cited

U.S. PATENT DOCUMENTS

| | | | |
|---|---|---|---|
| 6,950,855 B2 | 9/2005 | Sampathkumar | |
| 7,526,268 B2 * | 4/2009 | Fruit et al. | 455/404.2 |
| 7,738,504 B1 | 6/2010 | Deaner et al. | |
| 7,844,713 B2 | 11/2010 | Ikawa et al. | |
| 8,916,122 B2 * | 12/2014 | Laine | C07F 7/07 423/324 |
| 2002/0022452 A1 * | 2/2002 | Toya | H04B 7/1853 455/13.1 |

(Continued)

FOREIGN PATENT DOCUMENTS

CN  101394350 A  3/2009

OTHER PUBLICATIONS

Ansari, N., et al. "The performance evaluation of a new neutral network based traffic . . . ," IEEE Global Telecommunication 1991GLOBECOM 1991, vol. 1, 2-5, Dec. 1991, pp. 110-114.
Hewlett-Packard, "An Introduction to load testing for Web Applications", Aug. 2010, Rev. 1, 12 pgs https://h10078.www1.hp.com/cda/hpms/display/main/hpms.

(Continued)

*Primary Examiner* — Gerald Smarth
(74) *Attorney, Agent, or Firm* — Brook, Cameron & Huebsch, PLLC (57) ABSTRACT

Methods, machine-readable media, and systems are provided for self-organization of a satellite grid 102. One method for self-organization of a satellite grid 102 includes receiving, with a first satellite 108-1, a list of a plurality of managed nodes 110-1, 110-2, 110-3, 110-4, 110-5, 110-6, 110-7, 110-8, 110-9, receiving, with the first satellite 108-1, rules, calculating a first claim score for a particular one of the plurality of managed nodes 110-1 and the first satellite 108-1 according to the rules, comparing the first claim score with a second claim score for the particular node 110-1 and a second satellite 108-2 that is managing the particular node 110-1, and claiming management of the particular node 110-1 based on the comparison.

20 Claims, 4 Drawing Sheets

(56) References Cited

U.S. PATENT DOCUMENTS

| | | | |
|---|---|---|---|
| 2005/0197993 A1* | 9/2005 | Korotky | H04J 14/0284 706/52 |
| 2005/0207375 A1* | 9/2005 | Schiff | 370/331 |
| 2007/0127421 A1* | 6/2007 | D'Amico et al. | 370/338 |
| 2007/0201381 A1* | 8/2007 | Ekl et al. | 370/254 |
| 2009/0055507 A1 | 2/2009 | Oeda | |
| 2010/0030851 A1 | 2/2010 | Inden et al. | |
| 2010/0036903 A1 | 2/2010 | Ahmad et al. | |
| 2010/0085247 A1* | 4/2010 | Venkatraman | G01S 19/05 342/357.64 |
| 2010/0150122 A1* | 6/2010 | Berger et al. | 370/338 |
| 2010/0169477 A1 | 7/2010 | Stienhans et al. | |
| 2010/0299419 A1 | 11/2010 | Ramankutty et al. | |

OTHER PUBLICATIONS

Hewlett-Packard, "Testing Web 2.0 applications with HP Functional Testing Software", Jan. 2010, 7 pgs https://h10078.www.1hp.com/cda/hpms/display/main/hpms.

Morae, Techsmith, "Software Usability Testing with Morae", May 2009, 57 pgs http://download.techsmith.com/morae/docs/customer-research/.

Schneider, J., et al. "Distributed workflow management for large-scale grid . . . " International Symposium on Applications and the Internet, 2006. SAINT 2006. Jan. 23-27, 2006.

Korean Intellectual Property Office, International Search Report and Written Opinion, Dec. 7, 2011, 8 pages, Daejeon, Republic of Korea.

* cited by examiner

SELF-ORGANIZATION OF A SATELLITE GRID

BACKGROUND

Today, businesses are starting to transform their information technology (IT) environments to cloud computing, endeavoring to provide for flexibility and scalability of services. Rather than hosting all services on dedicated servers, virtualized machines can be used to host services. Hosting these services on virtualized machines, however, can pose challenges related to management of information associated with the services because the amount of information associated with the services can increase or decrease rapidly.

DETAILED DESCRIPTION

The present disclosure provides methods, machine readable media, and systems for self-organizing a satellite grid. A list of a plurality of managed nodes and rules can be received by a first satellite. A first claim score for a particular one of the plurality of managed nodes and the first satellite can be calculated according to the rules. The first claim score can be compared with a second claim score for the particular node and a second satellite; and management of the particular node can be claimed based on the comparison.

A novel technique for self-organizing a satellite grid that employs satellites claiming management of nodes based on the first and second claim score calculated according to rules (e.g., node claim rules (NCRs)) can provide a management architecture that can adapt to changes in the satellite grid (e.g., an increase or decrease in the number of nodes, an increase or decrease in data events associated with nodes, an increase or decrease in the number of satellites, and failed satellites). Although NCRs are just one example of rules, for ease of reference, "rules" will be referred to generically herein as NCRs. The satellites can negotiate their configuration with each other and balance their load (e.g., management of nodes and data events sent, received, and forwarded by the nodes), minimizing communication overhead with no required user interaction.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
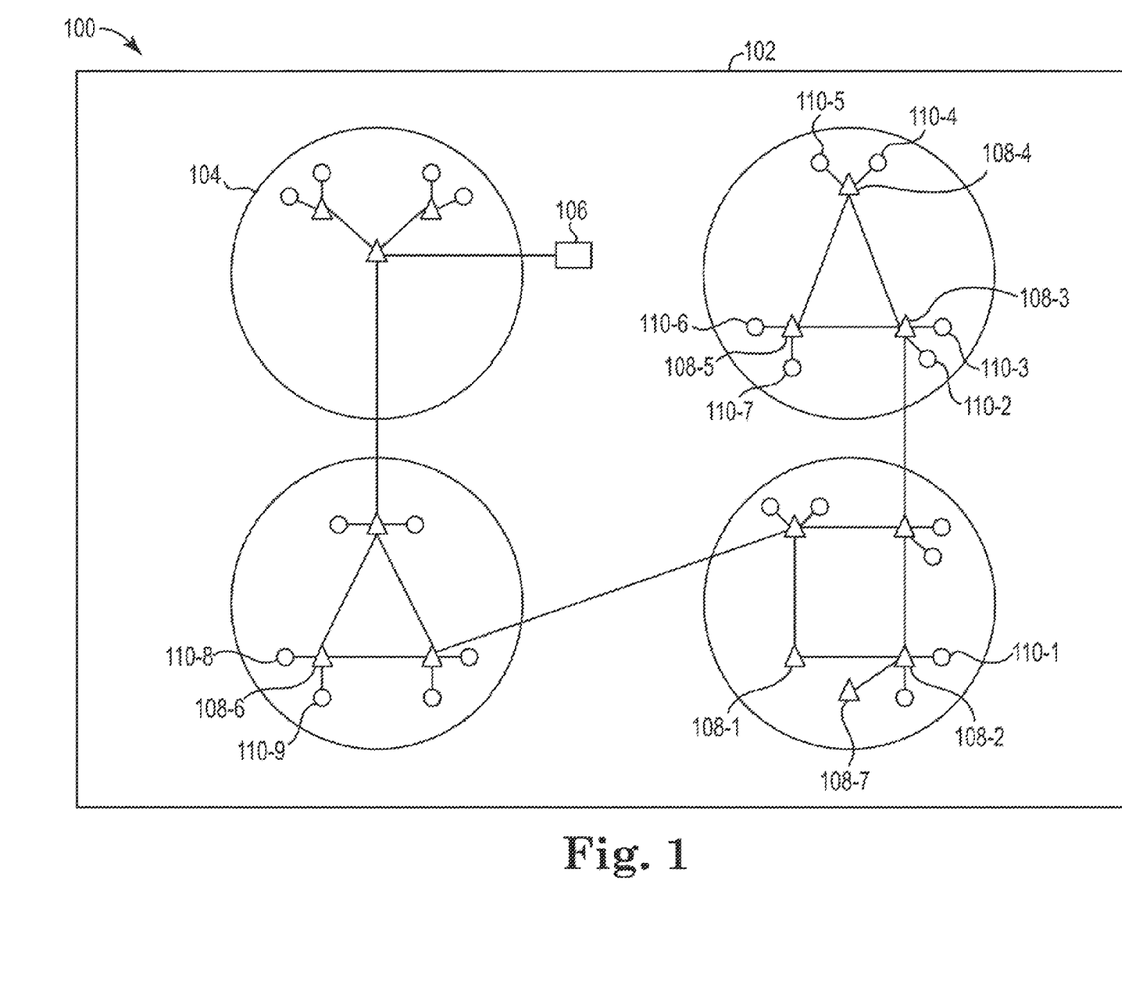
FIG. 1 illustrates an example of a system for self-organizing a satellite grid according to the present disclosure.

FIG. 1 illustrates an example of a system 100 for self-organizing a satellite grid 102 according to the present disclosure. The system can include a satellite grid 102. The satellite grid 102 can be a network that includes a plurality of satellites 108-1, 108-2, 108-3, 108-4, 108-5, 108-6, and 108-7, referred to generally herein as satellites 108, as indicated by the triangles, and a plurality of managed nodes 110-1, 110-2, 10-3, 110-4, 110-5, 110-6, 110-7, 110-8, 110-9, referred to generally herein as managed nodes 110, as indicated by the small circles. The satellite grid can include any number of satellites even though 14 satellites are shown in FIG. 1. Further, the satellite grid can include any number of nodes even though 22 nodes are shown in FIG. 1. The plurality of satellites 108 in the satellite grid 102 can have equal rights and responsibilities of a certain domain. For example, if there is a failing satellite 108-6, in the plurality of satellites 108, a number of other satellites can take over the responsibilities of the failing satellite 108-6.

The plurality of satellites 108 can be connected to each other to allow for communication of information, for example, data events, associated with the plurality of managed nodes 110 that the plurality of satellites 108 manage. Data events include any information associated with services that the nodes provide. The plurality of satellites 108 can be nodes that monitor the plurality of managed nodes 110 and provide management functionality over the nodes 110 that provide the service. A satellite 108 can manage any number of nodes 110 and is not limited to managing 2 nodes, even though 2 nodes are shown in FIG. 1.

The plurality of satellites 108 can monitor the plurality of managed nodes 110 by using agents deployed on the plurality of managed nodes 110. Agents are software programs that can prepare information and exchange information on behalf of the plurality of satellites 108 and communicate with other agents to collectively perform these tasks. When agents are used for monitoring the plurality of managed nodes 110, the agents can be installed on the plurality of managed nodes 110 and monitored by the plurality of satellites 108 such that a one to one relationship exists between the agent and a node and also a one to one relationship exists between the agent and a satellite.

The plurality of satellites 108 can also monitor the plurality of managed nodes 110 by using agent-less monitoring. Agent-less monitoring allows the plurality of managed nodes 110 to be monitored without installing an agent on each of the plurality of managed nodes 110 or the plurality of satellites 108. Agent-less monitoring can be performed by the plurality of satellites 108 using a broadcast ping. A ping is a program used to test whether a particular node is online, by sending an Internet control message protocol (ICMP) echo request and waiting for a response. Agent-less monitoring technology, such as, for example, Hewlett Packard's HP SiteScope can be used to monitor the plurality of managed nodes 110. Agent-less monitoring can also be performed through a port scan. The port scan can send a request to the plurality of nodes 110 to test whether the plurality of nodes 110 are online based on a response received.

The plurality of satellites 108 can be grouped in a number of subnetworks 104. The plurality of satellites 108 can be grouped by network topology (e.g. 104), however, the present disclosure is not limited to grouping satellites by a particular network topology. The number of subnetworks 104 are a number of subdivisions of the network formed by the plurality of satellites 108 in the satellite grid 102. A particular subnetwork 104 in the satellite grid 102 can include a domain manager 106 (e.g., satellite controller). The domain manager 106 is a program which provides information (e.g., a list of the plurality of managed nodes and node claim rules) through the satellite grid 102 by using, for example, infrastructure management software such as HP Operations Manger i. The domain manager 106 can provide a bridge between a user and the satellite grid 102 in the form of a user interface or web services. By using the domain manager 106, a user can configure the plurality of satellites 108 and access and consolidate data associated with the plurality of satellites 108. Although the domain manager 106 is shown connected to the plurality of satellites 108, it is not necessary for the domain manager 106 to be connected to the plurality of satellites 108 for the satellite grid 102 to function. Each of the subnetworks 104 can further include a plurality of managed nodes 110. The plurality of managed nodes 110 can be active devices attached to the network in the satellite grid 102 that can be managed by the plurality of satellites 108. Examples of managed nodes include 110-1, 110-2, 110-3, 110-4, 110-5, 110-6, 110-7, 110-8, 110-9.

Previous management techniques are manually configured and slow to address the changing needs of virtual data centers. A virtual data center can be a network of virtual machines in a virtualized environment, where the virtual machines are software implementations of a physical machine (e.g., a computer) that execute programs like a physical machine. The virtualized environment can be provided on a virtualization server. In an example, the virtualization server can be a physical server or a computer that has a hypervisor running on it. The hypervisor is software that provides a virtualized environment in which software, including operating systems, can run with the appearance of full access to underlying system hardware, but in fact such access is under control of the hypervisor. In an example, a hypervisor such as VMware ESX can be used to provide the virtualized environment.

Several techniques exist where servers are configured to manage nodes and data events associated with the nodes. These techniques can use, for example, several servers, configured in a manager of managers structure. A manager of managers structure can consist of, for example, several servers, where each server is configured with a different hierarchy. For example, a first, second, and third server may exist, where the third server forwards data events collected by the third server to the second server and the second server forwards data events collected by the second server from the third server to the first server. In this situation, each server instance must be configured and maintained separately.

This technique does not address the requirements associated with the changing needs of virtual data centers (e.g., an increase of services brought online, which allows for an increase in data events associated with the services). Therefore, challenges arise in managing nodes and the data events associated with the nodes because of the changing needs of virtual data centers.

Examples of the present disclosure can provide a scalable and flexible management system that does not require user interaction to configure management software for adapting to changes in the nodes and the data events associated with the nodes. The plurality of satellites 108 can negotiate their configuration and balance their load with each other. Thus, various examples of the present disclosure can provide a management architecture that enables self-configuration and balancing of loads of the plurality of satellites 108 with no need for user interaction.

The plurality of satellites 108 can include a first satellite 108-1 that can configure itself automatically after startup and connection to the satellite grid (e.g., the first satellite 108-1 has acquired an internet protocol (IP) address from a dynamic host configuration protocol (DHCP)) by using a discovery process, which can involve sending a user datagram protocol (UDP) broadcast request containing the type of the first satellite 108-1 and the IP address of the first satellite 108-1. The discovery process can include using IP unicast or multicast to deliver a message or information (e.g., type of satellite and IP address) to a group of destination objects, in this case, the plurality of satellites 108. The discovery process can be provided through services such as, for example, Jini, JGroup, or ZeroConf. The domain manager 106 or one of the plurality of satellites 108 already connected to the satellite grid 102 will respond to this request with a connection attempt to the first satellite 108-1. Upon connection, the first satellite 108-1 can receive a list of the plurality of managed nodes 110 from the domain manager 106. The first satellite 108-1 can also receive NCRs from the domain manager 106.

In an example, the first satellite 108-1 can be manually configured with the IP address of the domain manager 106 or one of the plurality of satellites 108 already connected to the satellite grid 102 so that the first satellite can establish contact without using a broadcast or multicast. Manual configuration can be performed, for example, if the subnetwork 104 of the domain manager 106 or one of the plurality of satellites 108 cannot be contacted through the UDP broadcast. Manual configuration can also be performed, for example, for a virtualized environment where the domain manager 106 is always available with a static IP address and the plurality of satellites 108 are hosted on virtualized resources with a DHCP, which are started on demand only.

If manual configuration is performed, the system can assign a group of nodes 110-2, . . . , 110-7 to a group of satellites 108-3, . . . , 108-5 and apply the NCRs only to the group of nodes 110-2, . . . , 110-7. In this case, the IP address of each node in the group of nodes 110-2, . . . , 110-7 can be assigned to each satellite in the group of satellites 108-3, . . . , 108-5. Each satellite in the group of satellites 108-3, . . . , 108-5 will then apply the NCRs only to the group of nodes 110-2 . . . , 110-7 whose IP addresses have been assigned to each satellite in the group of satellites 108-3, . . . , 108-5. If manual configuration is not performed, by default, the plurality of satellites 108 can run NCRs on the plurality of managed nodes 110 and not just the group of nodes 110-2, . . . , 110-7.

The first satellite 108-1 can calculate a first claim score for a particular one of the plurality of managed nodes 110 and the first satellite 108-1 by executing a number of NCRs and compare the first claim score with a second claim score for the particular node 110-1 and a second satellite 108-2 that is managing the particular node 110-1. A claim score, as used herein, includes a numerical value (e.g., −2, −1, 0, 2, 4, although examples are not so limited) that is calculated by a satellite, for a node, (e.g., the first satellite 108-1 and/or second satellite 108-2) according to the NCRs (e.g., the particular node 110-1). As discussed herein, the claim score is calculated by summing individual numerical values that are returned upon execution of the NCRs.

The first and second claim score can be used to determine what satellite should claim management of the node. In an example, if the first claim score between the first satellite 108-1 and the particular node 110-1 is 4 and the second claim score between the second satellite 108-2 and the particular node 110-1 is 1, the first satellite 108-1 can claim management of the particular node 110-1 because the first claim score is greater than the second claim score.

NCRs, as used herein, include rules that take into account a number of factors. Upon execution, each NCR returns an individual numerical value (e.g., +2, +1, +0, −1, or −2, although these examples are not so limited) that is particular to a condition that can occur under each factor. Factors taken into account by the NCRs can include what subnetwork 104 range the particular node 110-1 is in, whether the particular node 110-1 is already managed by the plurality of satellites 108, and the average number of managed nodes managed by the plurality of satellites 108, although these examples are not so limited.

Each individual numerical value that is generated upon execution of the NCRs can contribute the claim score. These individual numerical values can be summed to calculate the first and/or second claim score. In an example calculation of the first claim score between the first satellite 108-1 and the particular node 110-1, if the particular node 110-1 is not managed, an individual numerical value of +2 can be assigned to the particular node 110-1 by the NCRs. In this example, if the only factor considered was if the particular node 110-1 is managed, the claim score would be 2. However, other factors can also be considered, such as what subnetwork 104 range the particular node 110-1 is in and the average number of managed nodes managed by the plurality of satellites 108. For example, an individual numerical value of +2 may be assigned to the particular node 110-1 based on its subnetwork range. The first claim score can then be calculated by adding the individual numerical values, +2 and +2, which results in a claim score of 4. Further examples of factors that are accounted for by the NCRs in calculating the first and second claim scores are discussed herein.

As discussed herein, a factor that can contribute to the first and second claim scores can be the subnetwork 104 range of the particular node 110. For example, calculating the first claim score can include calculating the first claim score based on whether the particular node 110-1 is in the same subnetwork 104 range as the first satellite 108-1 in response to one of the NCRs. In this example, the second claim score can be calculated based on the subnetwork 104 range of the particular node 110. For example, the second claim score can be calculated based on whether the particular node 110-1 is in the same subnetwork 104 range as the second satellite 108-2.

The subnetwork 104 range can be determined by a classful network, which is an addressing architecture that divides the address space for Internet Protocol Version 4 into five address classes. The first three classes, classes A, B, and C, which are used in examples herein, can define a network size of the subnetworks 104. Although the classes are identified herein as class A, class B, and class C and examples of three classes are given, examples are not so limited. Individual numerical values can be assigned to each class (e.g., a value of −1 for class A, a value of +0 for class B, and a value of +2 for class C, although examples are not so limited), which can contribute to the first and second claim score. In an example, if a particular node 110 is in class C, an individual numerical value of +2 can be contributed to the first and/or second claim score.

As discussed herein, another factor that can contribute to the first and second claim scores can be whether the particular node 110-1 is already managed by a satellite 108. For example, calculating the first claim score can include calculating the first claim score based on whether the particular node 110-1 is managed by the second satellite 108-2 in response to one of the NCRs. In a further example, lithe particular node 110-1 is not managed by the second satellite 108-2, an individual numerical value of +2 can be contributed to the first claim score. Calculating the first claim score can further include calculating the first claim score based on the subnetwork 104 range of the second satellite 108-2 if the second satellite is managing the particular node 110-1 in response to one of the NCRs. If the particular node 110-1 is managed by the second satellite 108-2 and the second satellite 108-2 is in the same subnetwork 104 as the first satellite 108-1, an individual numerical value of +0 can be contributed to the first claim score. In a further example, if the particular node 110-1 is managed by the second satellite 108-2 and the second satellite 108-2 is in a different subnetwork 104 than the first satellite 108-1, an individual numerical value of −1 can be contributed to the first claim score. The second claim score can also be calculated based on whether the particular node is already managed by a satellite.

As discussed herein, another factor that can contribute to the first and second claim scores can consider an average number of managed nodes managed by the plurality of satellites 108. For example, calculating the first claim score can include calculating the first claim score based on the average number of managed nodes managed by the plurality of satellites 108 in a same subnetwork 104 range as the first satellite 108-1 in response to one of the NCRs. In determining the first claim score, the number of managed nodes managed by the plurality of satellites 108 in the same subnetwork 102 range as the first satellite 108-1 can be calculated. The average number of managed nodes managed by the plurality of satellites 108 in the same subnetwork 104 range as the first satellite 108-1 can then be determined. For a node that is managed by a satellite that is managing a number of nodes exceeding the average number of nodes managed by the plurality of satellites 108 in the same subnetwork 104 range as the first satellite 108-1, an individual numerical value of +1, for example, can be assigned to the node; thereby contributing an individual numerical value of +1 to the first claim score.

The second claim score can also be calculated based on the average number of managed nodes managed by the plurality of satellites 108. For example, the second claim score can be calculated based on an average number of managed nodes managed by the plurality of satellites 108 in a same subnetwork 104 range as the second satellite 108-2.

The system 100 can resolve a conflict that is created when calculating the first and second claim score results in a same first and second score between the particular node 110-1 and the first satellite 108-1 and the particular node 110-1 and the second satellite 108-2. This can be done by determining a response time between the particular node 110-1 and the first satellite 108-1 and the particular node 110-1 and the second satellite 108-2. For example, if the second satellite 108-2 that is managing the particular node 110-1 has a lower response time than the first satellite, then an individual numerical of +1 can be added to the second claim score.

After the first satellite 108-1 has run the NCRs on all nodes managed by the satellite grid 102, it has calculated a claim score for each node that is individual to the first satellite 108-1. The first satellite 108-1 now has the information to start claiming nodes. In an example, the first satellite 108-1 can claim as many nodes as the average number of managed nodes managed by the plurality of satellites 108 in the same subnetwork range as the first satellite 108-1.

As discussed herein, a comparison of the claim score with a claim score for the particular node 110-1 and a second satellite 108-2 can be performed. Based on the comparison of the claim score, the first satellite 108-1 can claim management of the particular node 110-1. As discussed herein, claiming management means that a satellite 108 will take responsibility for management of a node 110 and data events sent, received, and forwarded by the node 110. In an example, when the first satellite claims management of the particular node 110-1, the first satellite can communicate a data event from the particular node 110-1 to the second satellite 108-2 when the data event will have an impact on the second satellite 108-2.

The system 100 can claim the particular node 110-1 to be managed by the first satellite 108-1 by instructing the second satellite 108-2 managing the particular node 110-1 to release the particular node 110-1. The first satellite 108-1 can then claim responsibility of the particular node 110-1. In a case where agents are used, the first satellite 108-1 can reconfigure the agents to redirect messages to the first satellite 108-1.

A problem with self-organization of a satellite grid 102 can exist when one of the plurality of the satellites 108 fails. A failing satellite is represented by satellite 108-6 in FIG. 1. As a result of the failing satellite 108-6, a plurality of managed nodes 110-8 and 110-9 managed by the failing satellite 108-6 can be marked as unmanaged by the plurality of satellites 108-2. To counter this problem, the plurality of satellites 108-2 in the satellite grid 102 can have failover capability and can poll between each other to detect the failing satellite 108-6. In an example, the first satellite 108-1 can detect a failing satellite 106-6 based on the polling of the failing satellite 108-6. Failover capability can allow the first satellite 108-1 to switch over for the failing satellite 108-6 automatically when a failing satellite is detected. When the plurality of satellites 108 in the satellite grid 102 pall between each other, the plurality of satellites 108 can periodically check for a heartbeat on each other. As long as a heartbeat is detected, the plurality of satellites 108 will not initiate systems to take over for a particular one of the plurality of satellites 108. If an alteration in the heartbeat is detected in the failing satellite 108, at least one of the plurality of satellites 108 can immediately take over for the failing satellite 108. The detection of the failing satellite can result in marking the plurality of managed nodes 110-8 and 110-9 managed by the failing satellite 108-6 as not managed. In an example, the first satellite 108-1 can then run the NCRs on the first satellite 108-1 when the plurality of managed nodes 110-8 and 110-9 managed by the failing satellite 108-6 are marked as not managed on the first satellite.

The plurality of satellites 108 can also poll between each other to detect whether a data event from the particular node 110-1 managed by the second satellite 108-2 will have an impact on the first satellite 108-1. In an example, the second satellite 108-2 can determine if a data event from the particular node 110-1 managed by the second satellite 108-2 will have an impact on the first satellite 108-1. A data event from a particular node 110-1 managed by the second satellite 108-2 can have an impact on the first satellite 108-1 when data events sent, received, and forwarded by the particular node 110-1 managed by the second satellite 108-2 are related to data events that are managed by the first satellite 108-1. For example, if the first satellite 108-1 were managing a SAP system, the first satellite 108-1 may be interested in Oracle related events from a particular node 110-1 managed by the second satellite 108-2. If the second satellite 108-2 determines that a data event from the particular node 110-1 managed by the second satellite 108-2 will have an impact on the first satellite 108-1, the second satellite 108-2 communicates the event to the first satellite 108-1. In an example, the first satellite 108-1 can then claim management of the particular node 110-1.

A problem with self-organization of a satellite grid 102 can exist when the number of data events increases to a point such that a satellite managing nodes associated with the data events becomes overloaded and cannot manage the data events. This problem can be offset by cloning the second satellite 108-2, wherein a new satellite 108-7 is created, when a plurality of data events from the particular node 110-1 managed by the second satellite 108-2 exceed a predefined threshold. The second satellite can be cloned when the satellite (e.g., second satellite 108-2) is running in a virtualized environment. In an example, the second satellite 108-2 can instruct a virtualization server to clone the second satellite 108-2 to form the new satellite 108-7 and start the new satellite 108-7 on the same virtualization server or on a different virtualization server.

Once the second satellite 108-2 has been cloned to form the new satellite 108-7, the second satellite 108-2 and the new satellite 108-7 can distribute the data events by running the NCRs on the second satellite 108-2 and the new satellite 108-7. In an example, the data events can be re-distributed by running the NCRs on the plurality of satellites 108, including the new satellite 108-7.

Figure 2:
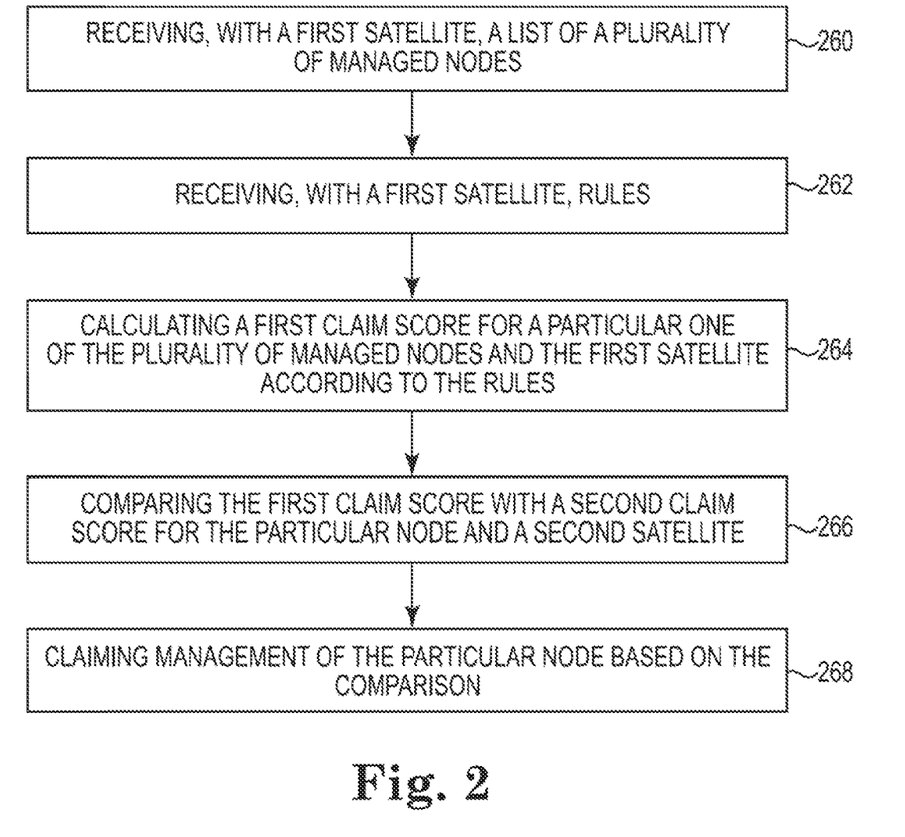
FIG. 2 illustrates a block diagram illustrating an example of a method for self organizing a satellite grid according to the present disclosure.

FIG. 2 illustrates a block diagram illustrating an example of a method for self organizing a satellite grid according to the present disclosure. The method includes receiving 260, with a first satellite, a list of the plurality of managed nodes. The method includes receiving 262, with the first satellite, NCRs. The method includes calculating 264 a claim score for a particular one of the plurality of managed nodes and the first satellite according to the NCRs. The method includes comparing 266 the claim score with a claim score for the particular node and a second satellite that is managing the particular node. The method also includes claiming 268 management of the particular node based on the comparison.

Figure 3:
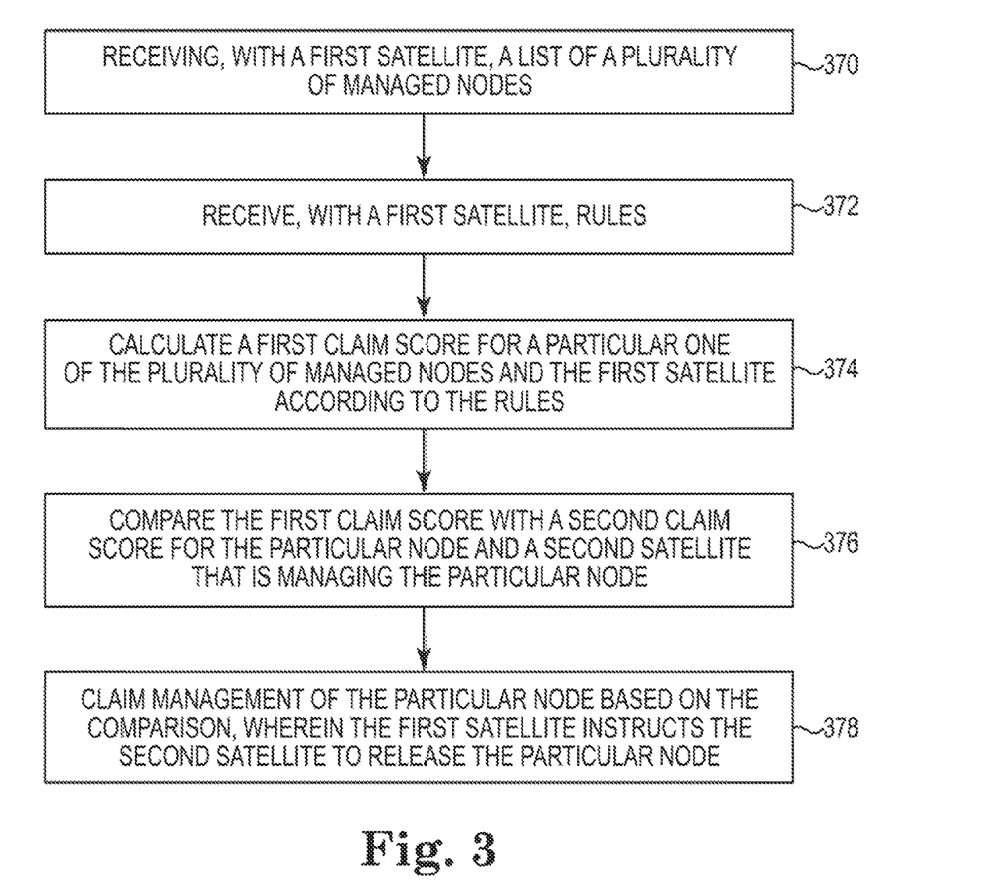
FIG. 3 illustrates a block diagram illustrating an example of a set of instructions to self-organize a satellite grid according to the present disclosure.

FIG. 3 illustrates a block diagram illustrating an example of instructions to self-organize a satellite grid according to the present disclosure. The medium can receive 370, with a first satellite, a list of a plurality of managed nodes. The medium can receive 372, with the first satellite, node claim rules (NCRs). The medium can calculate 374 a claim score for a particular one of the plurality of managed nodes and the first satellite according to the NCRs. The medium can compare 376 the claim score with a claim score for the particular node and a second satellite that is managing the particular node. The medium can also claim 378 management of the particular node based on the comparison, wherein the first satellite instructs the second satellite to release the particular node.

Figure 4:
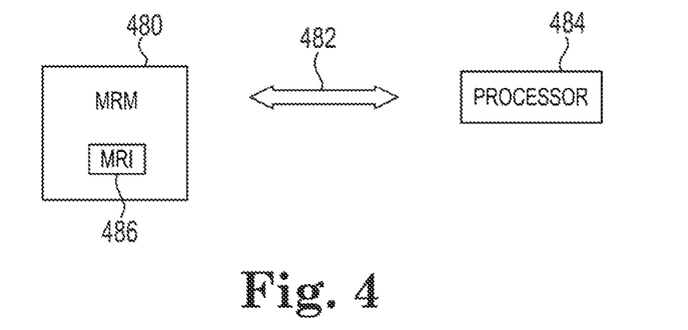
FIG. 4 illustrates a block diagram of an example of a machine readable medium in communication with processor resources according to the present disclosure.

FIG. 4 illustrates a block diagram of an example of a machine readable medium 480 in communication with processor resources 484 according to the present disclosure. A machine (e.g., a computing device) can include and/or receive a tangible non-transitory machine readable medium (MRM) 480 storing a set of machine readable instructions (MRI) (e.g., software) 486 for self organizing a satellite grid, as described herein. As used herein, processor 484 resources can include one or a plurality of processors such as in a parallel processing system. The machine readable medium 480 can include volatile and/or non-volatile memory such as random access memory (RAM), magnetic memory such as a hard disk, floppy disk, and/or tape memory, a solid state drive (SSD), flash memory, phase change memory, etc.

The MRM 480 can be in communication with the processor 484 resources via a communication path 482. The communication path 482 can be local or remote to a machine associated with the processor 484 resources. Examples of a local communication path 482 can include an electronic bus internal to a machine such as a computer where the MRM 480 is one of volatile, non-volatile, fixed, and/or removable storage medium in communication with the processor 484 resources via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

In other examples, the communication path 482 can be such that the MRM 480 is remote from the processor 484 resources such as in the example of a network connection between the MRM 480 and the processor 484 resources (e.g., the communication path 482 can be a network connection). Examples of such a network connection can include a local area network (LAN), a wide area network (WAN), a personal area network (PAN), the Internet, among other examples of networks. In such examples, the MRM 480 may be associated with a first machine (e.g., a server) and the processor 484 resources may be associated with a second machine (e.g., a computing device). The first and second machines can be in communication via a networked communication path 482.

It is to be understood that the above description has been made in an illustrative fashion, and not a restrictive one. Although specific examples have been illustrated and described herein, other component arrangements, instructions, and/or device logic can be substituted for the specific examples shown.

What is claimed:

1. A method for self-organizing a satellite grid, comprising:
   receiving, with a first satellite, a list of a plurality of managed nodes;
   receiving, with the first satellite, rules;
   calculating a first claim score for a particular one of the plurality of managed nodes and the first satellite according to the rules;
   comparing the first claim score with a second claim score for the particular node and a second satellite that is managing the particular node; and
   claiming management of the particular node based on the comparison.

2. The method of claim 1, wherein calculating the first claim score includes calculating the first claim score based on whether the particular node is in a same subnetwork range as the first satellite in response to one of the rules.

3. The method of claim 1, wherein calculating the first claim score includes calculating the first claim score based on whether the particular node is managed by the second satellite in response to one of the rules.

4. The method of claim 3, wherein calculating the first claim score includes calculating the first claim score based on a subnetwork range of the second satellite managing the particular node in response to one of the rules.

5. The method of claim 1, wherein calculating the first claim score includes calculating the first claim score based on an average number of managed nodes managed by a plurality of satellites in a same subnetwork range as the first satellite in response to one of the rules.

6. The method of claim 1, wherein the method includes:
   resolving a conflict that is created when calculating the first and second claim score results in a same first and second claim score between the particular node and the first satellite and the particular node and the second satellite;
   wherein the conflict is resolved by determining a response time between the particular node and the first satellite and the particular node and the second satellite.

7. The method of claim 1, wherein claiming the particular node to be managed by the first satellite includes the first satellite instructing the second satellite managing the particular node to release the particular node.

8. The method of claim 1, further comprising:
   the first satellite detecting a failing satellite based on a polling of the failing satellite; and
   marking a plurality of managed nodes managed by the failing satellite as not managed.

9. The method of claim 8, further comprising:
   running the rules on the first satellite when the plurality of managed nodes managed by the failing satellite are marked as not managed.

10. The method of claim 1, wherein management of the particular node is claimed by the first satellite or the second satellite.

11. The method of claim 10, wherein management of the particular node is claimed to balance respective loads on the first satellite and the second satellite.

12. A machine-readable non-transitory medium storing instructions for self-organizing a satellite grid executable by the computer to cause a computer to:
   receive, with a first satellite, a list of a plurality of managed nodes;
   receive, with the first satellite, rules;
   calculate a first claim score for a particular one of the plurality of managed nodes and the first satellite according to the rules;
   compare the first claim score with a second claim score for the particular node and a second satellite that is managing the particular node; and
   claim management of the particular node based on the comparison, wherein the first satellite instructs the second satellite to release the particular node.

13. The machine-readable non-transitory medium of claim 12 wherein the instructions include instructions executable by the computer to cause the computer to determine, with the second satellite, if a data event from the particular node managed by the second satellite will have an impact on the first satellite.

14. The machine readable non-transitory medium of claim 13 wherein the instructions include instructions executable by the computer to cause the computer to communicate, with the second satellite, the data event from the particular node managed by the second satellite to the first satellite, when the particular node managed by the second satellite will have an impact on the first satellite.

15. The machine readable non-transitory medium of claim 14 wherein the instructions include instructions executable by the computer to cause the computer to:

clone the second satellite, wherein a new satellite is created, when a plurality of data events from the particular node managed by the second satellite exceed a predefined threshold; and distribute, with the second satellite and the new satellite, the data events by running the rules on the second satellite and the new satellite.

16. The machine-readable non-transitory medium of claim 12, wherein management of the particular node is to be claimed to balance respective loads on the first satellite and the second satellite.

17. A system for self-organizing a satellite grid, comprising:

a machine including processor resources; and memory resources associated with the machine, the memory resources storing machine readable instructions that, when executed by the processor resources, cause the processor resources to:

calculate a first claim score for a particular one of a plurality of managed nodes and a first satellite by executing a number of node claim rules (NCRs);

compare the first claim score with a second claim score for the particular node and a second satellite that is managing the particular node; and claim management of the particular node based on the comparison.

18. The system of claim 17 wherein execution of the number of NCRs returns a number of individual numerical values, wherein the number of individual numerical values are summed to calculate the claim score.

19. The system of claim 17, wherein the first satellite is a first satellite server and wherein the second satellite is a second satellite server.

20. The system of claim 19, wherein management of the particular node is to be claimed to balance respective loads on the first satellite server and the second satellite server.

\* \* \* \* \*